(12) United States Patent
Kaufman (10) Patent No.: US 9,762,508 B2
(45) Date of Patent: Sep. 12, 2017

(54) RELAY OPTIMIZATION USING SOFTWARE DEFINED NETWORKING

(71) Applicant: Microsoft Technology Licensing, LLC, Redmond, WA (US)

(72) Inventor: Matthew T. Kaufman, Bonny Doon, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 93 days.

(21) Appl. No.: 14/505,439

(22) Filed: Oct. 2, 2014

(65) Prior Publication Data
US 2016/0099890 A1    Apr. 7, 2016

(51) Int. Cl.
| | |
|---|---|
| G06F 15/16 | (2006.01) |
| H04L 12/933 | (2013.01) |
| H04L 12/24 | (2006.01) |
| H04L 29/08 | (2006.01) |
| H04L 29/12 | (2006.01) |
| H04L 12/721 | (2013.01) |
| H04L 12/717 | (2013.01) |
| H04L 29/06 | (2006.01) |

(52) U.S. Cl.
CPC ............. *H04L 49/15* (2013.01); *H04L 41/04* (2013.01); *H04L 45/38* (2013.01); *H04L 45/42* (2013.01); *H04L 61/2575* (2013.01); *H04L 61/2589* (2013.01); *H04L 67/104* (2013.01); *H04L 67/1074* (2013.01); *H04L 67/42* (2013.01); *H04L 61/2507* (2013.01)

(58) Field of Classification Search
CPC ......... H04L 49/15; H04L 41/04; H04L 45/38; H04L 45/42; H04L 61/2575; H04L 61/2589; H04L 67/1074; H04L 61/2507; H04L 67/104

USPC ........................................................ 709/203
See application file for complete search history.

(56) References Cited

U.S. PATENT DOCUMENTS

| | | | |
|---|---|---|---|
| 8,379,653 B2 * | 2/2013 | Han ..................... | H04L 12/2818 370/401 |
| 8,432,896 B2 | 4/2013 | Foster et al. | |
| 8,588,233 B1 * | 11/2013 | Lohner ............... | H04L 61/2007 370/392 |

(Continued)

FOREIGN PATENT DOCUMENTS

| | | |
|---|---|---|
| CN | 103236945 | 8/2013 |
| CN | 103534992 | 1/2014 |
| WO | WO-2014077352 | 5/2014 |

OTHER PUBLICATIONS

"International Search Report and Written Opinion", Application No. PCT/US2015/055378, Dec. 21, 2015, 16 pages.

(Continued)

*Primary Examiner* — Melvin H Pollack (57) ABSTRACT

Various embodiments provide a system for modifying a channel binding in order to relay packets between a relay client and a peer in a peer-to-peer (P2P) communication event across a network. A relay server receives a request to bind a channel in order to relay the packets for the communication event. The relay server creates requirements for a communication path. The relay server sends the requirements to a Software Defined Networking (SDN) controller. The SDN controller in turn creates and installs flows and flow tables in SDN switches to relay the packets across the network for the communication event.

25 Claims, 7 Drawing Sheets

(56) References Cited

U.S. PATENT DOCUMENTS

| | | | |
|---|---|---|---|
| 8,611,354 B2* | 12/2013 | Keranen et al. | H04L 29/12537 370/392 |
| 8,701,179 B1* | 4/2014 | Penno | H04L 63/02 709/227 |
| 8,938,553 B2* | 1/2015 | Ly | H04L 41/00 709/233 |
| 9,003,042 B2* | 4/2015 | Choi | H04L 67/104 709/217 |
| 9,049,122 B2* | 6/2015 | Andersen | H04L 43/0852 |
| 9,100,282 B1* | 8/2015 | Raps | H04L 45/02 |
| 9,137,161 B2* | 9/2015 | Zhang | H04L 47/10 |
| 9,137,200 B2* | 9/2015 | Blau | H04L 61/2589 |
| 9,203,748 B2* | 12/2015 | Jiang | H04L 45/64 |
| 9,294,406 B2* | 3/2016 | Liou | H04L 47/122 |
| 9,369,426 B2* | 6/2016 | Koponen | H04L 47/12 |
| 2013/0039367 A1* | 2/2013 | Ene | H04L 67/104 370/401 |
| 2013/0311675 A1 | 11/2013 | Kancherla | |
| 2014/0019639 A1 | 1/2014 | Ueno | |
| 2014/0165196 A1 | 6/2014 | Dalal et al. | |
| 2014/0177460 A1* | 6/2014 | Keskkula | H04L 45/128 370/252 |
| 2014/0280989 A1* | 9/2014 | Borkowski | H04L 67/104 709/228 |
| 2014/0298415 A1* | 10/2014 | Xie | H04L 61/2589 726/3 |
| 2014/0355614 A1* | 12/2014 | Liu | H04L 61/2589 370/392 |
| 2015/0092551 A1* | 4/2015 | Moisand | H04L 12/4633 370/235 |
| 2015/0113132 A1* | 4/2015 | Srinivas | H04L 41/0816 709/224 |
| 2015/0113154 A1* | 4/2015 | Nguyen | H04L 67/141 709/228 |
| 2015/0188882 A1* | 7/2015 | Wang | H04L 61/2589 370/352 |
| 2015/0281174 A1* | 10/2015 | Hwang | H04L 61/2589 709/244 |
| 2015/0281344 A1* | 10/2015 | Grootwassink | H04L 67/104 713/168 |
| 2015/0312215 A1* | 10/2015 | Kher | H04L 45/30 726/11 |
| 2015/0326526 A1* | 11/2015 | Zeng | H04L 61/103 370/392 |
| 2015/0381428 A1* | 12/2015 | Ong | H04L 41/12 709/223 |
| 2016/0073278 A1* | 3/2016 | Roessler | H04L 49/70 370/252 |
| 2016/0080505 A1* | 3/2016 | Sahin | H04L 67/148 709/229 |
| 2016/0119228 A1* | 4/2016 | Gao | H04L 47/2408 370/392 |

OTHER PUBLICATIONS

"OpenFlow Switch Specification 1.4.0", Retrieved from the Internet: http://www.opennetworking.org/images/stories/downloads/sdn-resources/onf-specifications/openflow/openflow-spec-v1.4.0.pdf, Oct. 14, 2013, 206 pages.

Wing,"Turn extension to convey flow characteristics", draft-wing-tsvwg-turn-flowdata-01, Sep. 10, 2014, 13 pages.

"Open Flow Switch Specification", Retrieved from <https://www.opennetworking.org/images/stories/downloads/sdn-resources/onf-specifications/openflow/openflow-spec-v1.3.3.pdf>, Sep. 27, 2013, 164 pages.

Figueiredo, et al.,' "IP Over P2P (IPOP)", White Paper. Available at <http://new.ipop-project.org/wp-content/uploads/2013/12/IPOP-WhitePaper-1401.pdf>, Jan. 17, 2014, 31 pages.

Mahy, et al.,' "Traversal Using Relays around NAT (TURN) Relay Extensions to Session Traversal Utilities for NAT (STUN)", Retrieved at <<http://tools.ietf.org/html/rfc5766>>, Internet Engineering Task Force (IETF), Apr. 2010, 67 pages.

Moshref, et al.,' "Flow-level State Transition as a New Switch Primitive for SDN", In Proceedings of the ACM SIGCOMM Workshop on Hot Topics in Software Defined Networking, Aug. 22, 2014, 6 pages.

"Second Written Opinion", Application No. PCT/US2015/053378, Aug. 31, 2016, 11 pages.

Azodolmolky,"Introducing OpenFlow", In Book of Software Defined Networking with Open Flow, Chapter 1, Published by Packet Publishing Ltd., Oct. 25, 2013, pp. 7-21.

"International Preliminary Report on Patentability", Application No. PCT/US2015/053378, dated Dec. 13, 2016, 12 pages.

\* cited by examiner

RELAY OPTIMIZATION USING SOFTWARE DEFINED NETWORKING

BACKGROUND

Establishing a Peer-to-Peer (P2P) communication path between two hosts across packet networks can be challenging when one or both of the hosts are connected to the packet network through Network Address Translation (NAT) or firewalls. The hosts attempt to ascertain public addresses to establish a P2P communication session. However, when both hosts are connected through NAT, these attempts often fail to establish a direct connection between the P2P hosts, and a relay must be used to establish the P2P communication session. The relay is a host on an open network that relays communication packets between the P2P hosts. All traffic between the peer hosts passes through the relay at the expense of network bandwidth and processing at the relay host. As the number of hosts connected through NAT in a P2P network increases, more relay hosts are needed to provide capacity for relaying traffic in the P2P network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a system for modifying a channel binding in order to relay packets between a relay client and a peer in a peer-to-peer (P2P) communication event across a network. A relay server receives a request to bind a channel in order to relay the packets for the communication event. The relay server creates requirements for a communication path. The relay server sends the requirements to a Software Defined Networking (SDN) controller. The SDN controller in turn creates and installs flows and flow tables in SDN switches to relay the packets across the network for the communication event.

Various embodiments provide a SDN switch that relays packets across a network in a P2P communication event between a relay client and a peer. A SDN controller configures the SDN switch with flows and flow tables that the SDN switch uses to inspect fields in received packets between the relay client and the peer. Based upon one or more fields matching one or more of the flows, the SDN switch relays the received packets for the communication event.

Various embodiments enable modifying a list of candidate transport addresses for NAT traversal. A signaling controller modifies the candidate list by inserting transport addresses for a forwarding path, which relays packets between a relay client and a peer in a P2P communication event across a network. The forwarding path is preconfigured by a SDN controller.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Peer-to-Peer (P2P) communication between hosts is useful for various forms of real-time communication events, such as VoIP, web conferencing, screen sharing, instant messaging, and such. There are challenges in establishing a communication path for these communication events when one or both of the hosts are connected to a packet network through Network Address Translation (NAT). Interactive Connectivity Establishment (ICE), which is specified in IETF RFC 5245, and Session Traversal Utilities for NAT (STUN), which is specified in IETF RFC 3489, can be used by a host to attempt to ascertain a transport address to establish a P2P communication session.

Hosts using ICE attempt to establish a communication path using a list of candidate transport addresses. The transport addresses typically include an address and a port, such as an IPv4 address and port number. IPv6 addressing can be used as well. The candidate transport addresses may be communicated between the hosts through a signaling server, for example a SIP server. Candidate transport addresses can also be obtained by the host using STUN.

When both hosts are connected through NAT or firewalls, direct connections or ICE/STUN may fail to establish a direct connection between the hosts. In this case, a relay is used to establish the P2P communication session. One such relay technique is Traversal Using Relays around NAT (TURN), in which a host on an open network acts as a relay server to relay packets between the P2P hosts. When the relay server relays packets for the P2P communication, all traffic between the hosts passes through the relay server at the expense of network bandwidth and processing at the relay server.

Various embodiments provide a system for modifying a channel binding in order to relay packets between a relay client and a peer, in a peer-to-peer (P2P) communication event across a network. The relay client and/or the peer are both connected to the network through Network Address Translation (NAT). A relay server receives a request to bind a channel in order to relay packets for the communication event. The relay server creates requirements for a communication path. The relay server sends the requirements to a Software Defined Networking (SDN) controller. The SDN controller in turn creates and installs flows and flow tables in SDN switches to relay packets across the network for the communication event.

Various embodiments provide a SDN switch that relays packets across a network in a P2P communication event between a relay client and a peer. A SDN controller configures the SDN switch with flows and flow tables that the SDN switch uses to inspect fields in received packets between the relay client and the peer. Based upon one or more fields matching one or more of the flows, the SDN switch relays the received packets for the communication event. Various embodiments include removing and/or modifying fields in the received packets before relaying the received packet.

Various embodiments enable modifying a list of candidate transport addresses for NAT traversal. A signaling controller modifies the candidate list by inserting transport addresses for a forwarding path, which relays packets between a relay client and a peer in a P2P communication event across a network. The forwarding path is preconfigured by a SDN controller. Various embodiments modify the relay client and/or the peer, such that the relay client and/or the peer add a transport address for the forwarding path in the list of candidate transport addresses offered by the relay client and/or the peer.

In the discussion that follows, a section entitled "Example Environments" describes example environments in which the various embodiments can be utilized. Next, a section entitled "Modified Channel Binding" describes an example of modifying a channel binging, in accordance with one or more embodiments. Following this, a section entitled "Packet Modification in SDN Switches" describes examples in which SDN switches modify packets to relay the packets in accordance with one or more embodiments. Next, a section entitled "NAT Traversal Forwarding Using a Modified ICE Candidate List" describes examples of modifying candidate lists photo log in accordance with one or more embodiments. Next, as section entitled "Example Methods" describes example methods in accordance with one or more embodiments. Last, a section entitled "Example Device" describes an example device in accordance with one or more embodiments.

Consider now example environments in which various embodiments can be practiced.

Example Environments

Figure 1:
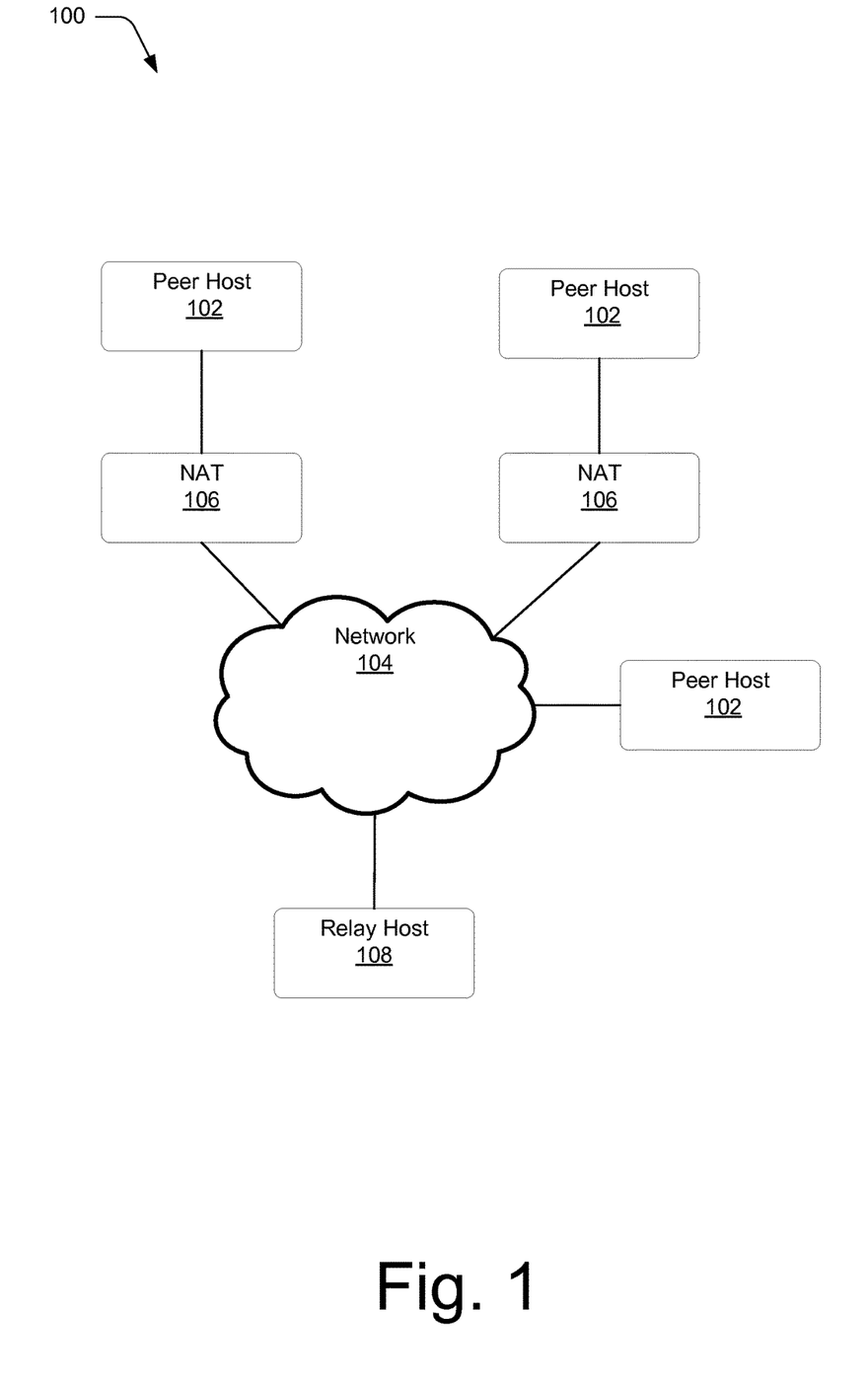
FIG. 1 illustrates an example operating environment in accordance with one or more embodiments.

FIG. 1 illustrates an example environment 100 in accordance with one or more embodiments. Environment 100 includes peer hosts 102 connected to network 104. Here, peer hosts 102 are configured for Peer-to-Peer (P2P) communication across network 104. Peer host 102 can be any suitable device configured in any suitable way, such as, by way of example and not of limitation, a mobile phone, a tablet, a gaming device, a desktop Personal Computer (PC), a laptop PC, and so forth.

The network 104 represents any suitable type of packet network through which peer hosts 102 can connect, such as a wireless cellular network, wireless internet access (Wi-Fi), the Internet, and so forth. The embodiments described herein apply to any suitable packet network, for example, networks such as those using IPv4, IPv6, any combination of IPv4 and IPv6, and such. While not illustrated, the network 104 can include additional processing entities, such as servers, wireless access points, cellular base stations, and so forth. The network 104 may be configured in any suitable way, such as, by way of example and not of limitation, a single network, a combination or federation of multiple interconnected networks, a virtualized network, and so forth.

A peer host 102 may connect directly to the network 104, in which case the peer host 102 has a public address on the network 104 that can be used by other peer hosts 102 for P2P communication. Alternatively, the peer host 102 may connect to the network 104 through Network Address Translation (NAT) 106. The NAT 106 may be part of a router, firewall, access point, or any other suitable network equipment. When connected through NAT 106, peer host 102 has a private address in a network that is behind the NAT 106 and the NAT 106 has a public address on the network 104.

When a peer host 102 is behind a NAT 106, it may be difficult or impossible for the peer host 102 to exchange packets for P2P communication with another peer host 102. When a direct communication path cannot be found between two peer hosts 102, the two peer hosts 102 may use a relay host 108 connected to network 104 in order to relay packets between the two peer hosts 102. The relay host 108 is typically connected to a public network, such as the Internet, with a public address.

The relay host 108 may be configured to use any suitable relay protocol, for example Traversal Using Relays around NATs (TURN), which is specified in IETF RFC 5766, to perform the relay operations. Any other suitable protocol may also be used to implement relay operations. The relay host 108 can be implemented on any suitable computing device, such as a computer server executing software that implements the relay protocol. The relay host 108 receives a packet from a first peer host 102 over the network 104, the relay host 108 examines the packet for a destination address, and the relay host 108 then sends the application data from the packet over the network 104 to a second peer host 102 at the destination address.

The relay protocol may provide multiple mechanisms for relaying packets. For example, TURN supports a send mechanism and a channel mechanism. The channel mechanism uses a packet format known as a channel data message with a four byte header that includes a channel number and a length of the included application data. For P2P communications, which sends a large amount of traffic between the peer hosts 102, the channel mechanism provides lower overhead than the send mechanism, thus reducing the bandwidth required between the peer hosts 102 when packets are relayed through the relay host 108.

Figure 2:
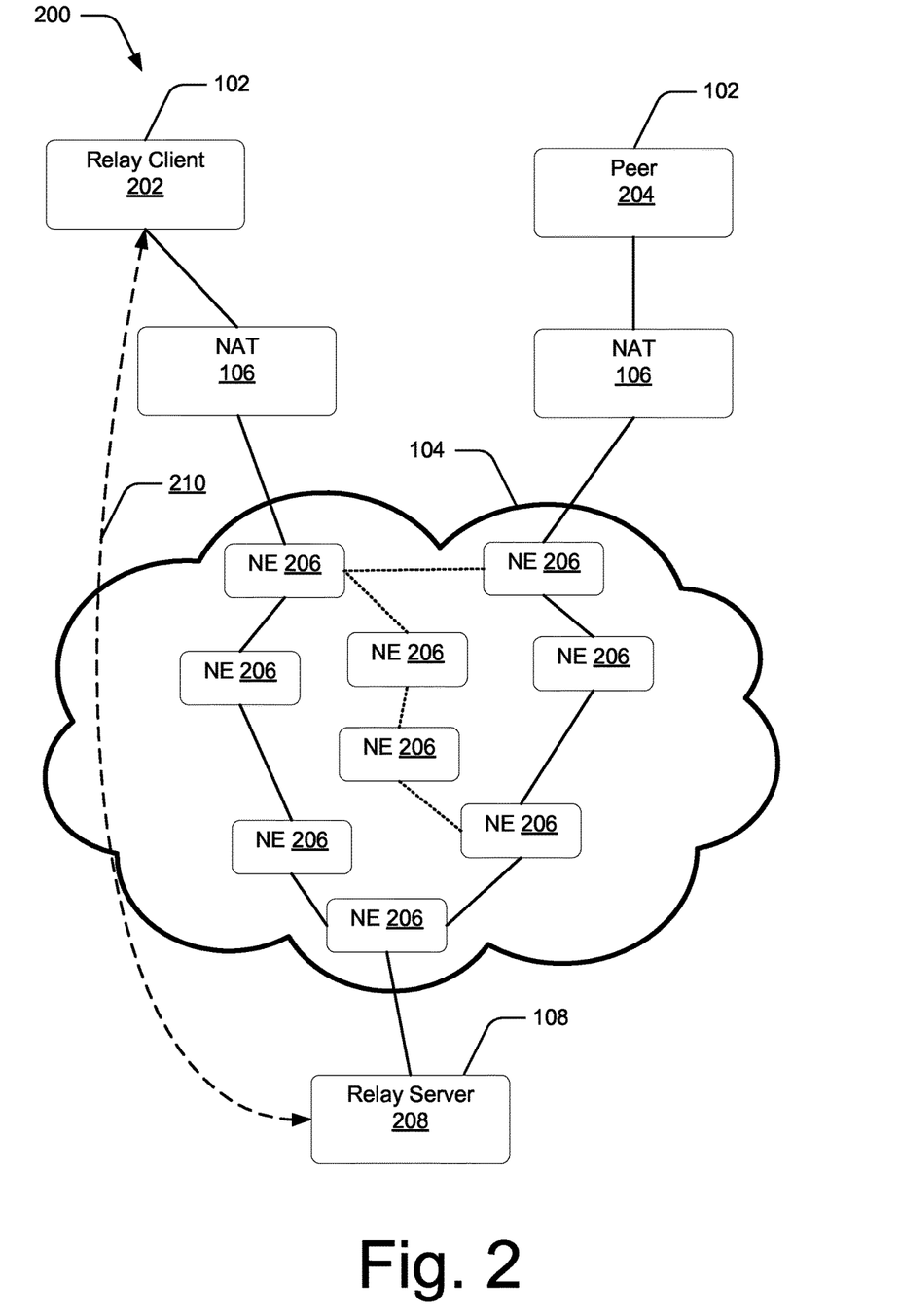
FIG. 2 illustrates an example operating environment in accordance with one or more embodiments.

FIG. 2 illustrates an example environment 200 in accordance with one or more embodiments. Environment 200 includes a peer host 102 configured as a relay client 202 connected to network 104 through a NAT 106. A peer host 102 is configured as peer 204, which is also connected to the network 104 though a NAT 106. The network 104 comprises a number of network elements 206 (illustrated in FIG. 3 as "NE" for clarity) that are interconnected to communicate packets though the network 104. The network elements 206 may be routers, switches, gateways, servers, or any other suitable devices for communicating packets through the network 104 by routing, switching, repeating, forwarding, or other suitable mechanisms.

A relay host 108 is configured as a relay server 208 and is connected to the network 104. The relay client 202 and the peer 204 are both connected to the network 104 through the NATs 106, so the relay client 202 establishes a relayed connection through the relay server 208 to conduct P2P communication with the peer 204.

To use the channel mechanism for communication, the relay client 202 sends a channel bind request to the relay server 208 including an unbound channel number and a transport address for peer 204, as shown at 210. The channel number is bound in the relay server 208 to the transport address of the peer 204 and a transport address of the relay client 202. If the channel binding is successful, the relay server 208 sends a channel bind success message to the relay client 202.

The channel binding will last for a limited period of time, for example 10 minutes, unless the channel binding is refreshed by the relay client 202. To refresh the channel binding, the relay client 202 sends another channel bind request, including the same channel number, to the relay server 208, causing the rebinding of the channel to the peer 204.

Once the channel number is bound, the relay client 202 sends packets containing application data for the P2P communication to the relay server 208 using the channel data message. The relay server 208 receives the channel data message, and relays the application data to the peer 204 using the transport address of the peer 204 in the channel binding. Packets containing application data from the peer 204 to the relay client 202 can also be relayed by the TURN server 208 using the same channel binding. The TURN server 208 receives a packet with application data from peer 204 and creates a channel data message that includes the received application data and sends the created channel data message to the relay client 202.

An example flow of packets for P2P communication between the relay client 202 and the peer 204 is shown in FIG. 2 by the solid lines from the relay client 202, though the network elements 206 of the network 104, to the relay server 208, and from the relay server 208, though the network elements 206 of the network 104, to the peer 204. Accordingly, the relay server 208 both receives and transmits all the application data sent between the relay client 202 and the peer 204, requiring that the relay server 208 have sufficient network bandwidth and processing capability to handle this traffic load.

Software Defined Networking (SDN), for example OpenFlow, provides components for software configurable networking, which are based on the networking requirements of various applications. An application, which is configured to use SDN, programmatically communicates networking requirements for the application to an SDN controller. The SDN controller translates the networking requirements into flows that are configured in flow tables in SDN switches or network elements. The SDN switches process incoming packets by matching fields in those packets to flows in one or more flow tables, typically arranged in a pipeline. When one or more fields in a packet match values in a match field of a flow, instructions included in the flow are executed on the packet. Those instructions may forward the packet to a successive flow table in the pipeline or forward the processed packet out a port of the SDN switch.

Alternatively, flows may be defined and executed for "not-matched" packets that do not match any field values in other flows configured in the SDN switch. The instructions executed on not-matched packets, as well as matched packets, may trigger communication between an SDN switch and an associated SDN controller to install one or more additional flows in the SDN switch to process packets. As such, an SDN switch would not be need to be configured with flows to relay packets until that capability was needed, as indicated by receiving a packet for relay that is not-matched.

A flow entry in a flow table may comprise match fields to match against fields in packets, a priority to specify precedence of the flow within the flow table, counters to track numbers of matched packets, instructions to perform on the matched packets, timeouts that specify an amount of time before a flow expires, and other fields for management of the flow entries. By distributing packet processing logic to flow tables in SDN switches, application-specific network switching and routing is optimized for the hosts sending and receiving traffic for various applications.

By configuring packet switching and forwarding in the flow tables of the SDN switches, the SDN switches relay packets between the relay client and the peer. The host computer of the relay server no longer needs to execute a relay program to receive, process, and transmit the packets in a relayed communication. The computational and network bandwidth requirements for the relay server are greatly reduced by using the SDN switches to relay packets. As discussed below, and with respect to FIG. 3, the SDN switches that relay packets can be placed close to the edge of the network. This reduces both latency in the relay and the overall network bandwidth the relay consumes.

Figure 3:
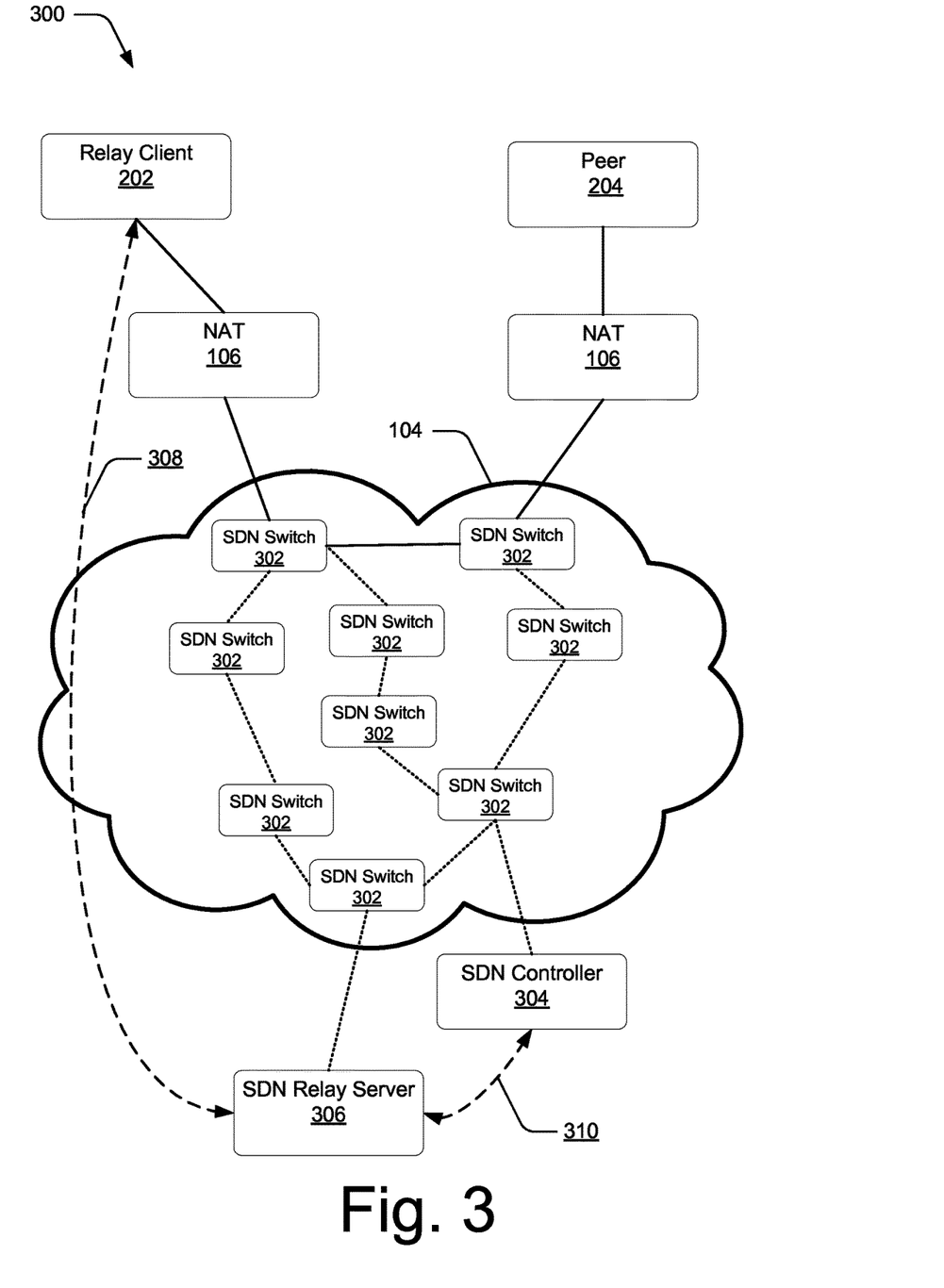
FIG. 3 illustrates an example operating environment in accordance with one or more embodiments.

FIG. 3 illustrates an example environment 300 in accordance with one or more embodiments. Environment 300 includes a peer host 102 configured as a relay client 202 connected to the network 104 through a NAT 106. A peer host 102 is configured as peer 204, and is connected to the network 104 though a NAT 106. The network 104 comprises a number of network elements that are SDN switches 302, which are interconnected to communicate packets though the network 104. SDN controller 304 is connected to the network 104 to configure the SDN switches 302 using any suitable control protocol, for example the OpenFlow protocol. For clarity of illustration, the network 104 is shown comprising SDN switches 302, but the network 104 may also include other network elements, such as routers, switches, gateways, servers, or any other suitable devices for communicating packets by through the network 104.

SDN relay server 306 is connected to the network 104 and is configured to implement one or more modified versions of a relay protocol to optimize network routing and performance for P2P communication using features of SDN to relay packets. Although the SDN Controller 304 and the SDN relay server 306 are shown as separate entities, it should be understood that the functions performed by the SDN controller 304 and the SDN relay server 306 can be combined together or distributed in any suitable manner without changing the scope of the claimed subject matter.

It should be understood that the SDN controller 304 may be configuring the SDN switches 302 in any suitable way, such as, by way of example and not of limitation, within a single network, across a federation of multiple networks, and so forth. Also, the SDN controller 304 may be configuring the SDN switches 302 to form one or more virtual networks within a single network, across a federation of multiple networks, and so forth, in any suitable way, such as, by way of example and not of limitation, to form an application-specific virtual network, a client-specific virtual network, and so forth. It should also be understood that any combination of communications among the relay client 202, the SDN relay server 306, the SDN controller 304, and/or the SDN switches 302 may be performed using authentication and/or encryption to assure the communications are authorized and/or secure.

Various embodiments described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media. Accordingly, non-statutory forms of media such as carrier waves and signals per se are not intended to be covered by the term "computer-readable storage medium".

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

One such configuration of a computer-readable medium is signal bearing medium and thus is configured to transmit the instructions (e.g., as a carrier wave), such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Modified Channel Binding

In one or more embodiments, the channel binding process of the relay protocol is modified to configure the SDN switches 302 to relay packets between the relay client 202 and the peer 204. The relay client 202 sends a channel bind request to the SDN relay server 306 including an unbound channel number and a transport address for the peer 204, as shown at 308. If the channel binding is successful at the SDN relay server 306, the SDN relay server 306 optionally sends a channel bind success message to the relay client 202.

The SDN relay server 306 forms channel binding requirements for relaying packets between the relay client 202 and the peer 204. The SDN relay server 306 sends the channel binding requirements to the SDN controller 304 over the network 104, as shown at 310. The requirements may include a source address, a source port, destination address, destination port, differentiated service code point (DSCP) values, and/or a period of time for which the channel binding should last.

The SDN controller 304 processes the received channel binding requirements to create flows and flow tables for the channel binding. The SDN controller 304 installs, over the network 104, the created flows and flow tables into one or more of the SDN switches 302 to configure a forwarding path to relay packets between the relay client 202 and the peer 204.

The channel binding will last for a limited period of time, for example 10 minutes, unless the channel binding is refreshed by the relay client 202 by sending another channel bind request, including the same channel number, to the SDN relay server 306, rebinding the channel to the peer 204. In response to receiving the channel binding message from the relay client 202 to refresh the channel binding, the SDN relay server 306 sends a message to the SDN controller 304. In response to receiving the message, the SDN controller 304 refreshes the flows and flow tables in the SDN switches 302 to maintain the forwarding path for the channel binding.

The flow of packets between the relay client 202 and the peer 204 is shown by the solid lines in FIG. 3 from the relay client 202, though the SDN switches 302 of the network 104, to the peer 204. As shown in FIG. 3, the flow of packets between the relay client 202 and the peer 204 is now relayed using the SDN switches 302 that are closer to the edge of the network 104 reducing the overall network utilization of the network 104. Network bandwidth and processing requirements for the SDN relay server 306 are also reduced, as packets are no longer relayed by the SDN relay server 306 when using the modified channel binding.

In one or more embodiments, the channel data message of the relay protocol can be modified when the relay is performed by the SDN switches 302. The flows and flow tables installed in the SDN switches 302 may perform the relay by inspecting a number of packet fields contained in the TCP and/or UDP packets sent between the relay client 202 and the peer 204. These packet fields are compared to match fields specified in the flows in the SDN switches 302.

For example, a channel data message is sent in a UDP or TCP packet. The channel data message contains fields identifying a channel number and a length of the application data in the channel data message. The flows in the SDN switch 302 perform the relay by inspecting fields in TCP and/or UDP packets that precede the channel data message in the TCP and/or UDP packet. The decision by the flows in the SDN switch 302 to relay a packet can be made without inspecting the fields in the channel data message.

In one or more embodiments, packets can be relayed after channel binding without using the channel data message, when the flows in the SDN switch 302 perform the relay by inspecting the preceding fields in TCP and/or UDP packets. The relay protocol in the relay client 202 may be modified to send and receive application data without including the header of the channel data message.

Omitting the channel number and the length of the application data fields in the channel data message reduces the overhead in the packets sent to and from the relay client 202, and reduces the bandwidth required in the network 104 to relay the packets. The process of initializing and refreshing the channel binding with the SDN relay server 306, SDN Controller 304, and the SDN Switches 302, as described above, remains the same when using the modified relay protocol that omits the channel number and the length of the application data fields in the channel data message.

Packet Modification in SDN Switches

In one or more embodiments, the SDN switches 302 are configured to perform the relay of channel data messages of the relay protocol based on channel bindings allocated in the SDN relay server 306 and using flows and flow tables defined by the SDN controller 304 and installed in the SDN switches 302. As described above, the relay client 202 sends a channel bind request to the SDN relay server 306 including an unbound channel number and a transport address for the peer 204, as shown at 308. The SDN relay server 306 forms channel binding requirements for relaying packets between the relay client 202 and the peer 204. The SDN relay server 306 sends the channel binding requirements to the SDN controller 304 over the network 104, as shown at 310. The requirements may include source and destination addresses, port numbers, differentiated service code point (DSCP) values, a channel number, and/or a period of time for which the channel binding should last.

The SDN controller 304 processes the received channel binding requirements to create flows and flow tables for a forwarding path for the channel binding. The SDN controller 304 installs, over the network 104, the created flows and flow tables into one or more of the SDN switches 302 to configure the forwarding path to relay packets between the relay client 202 and the peer 204. The channel binding will last for a limited period of time, for example 10 minutes, unless the channel binding is refreshed by the relay client 202, as described above.

In one or more embodiments, the channel data message is received at the SDN switch 302. The flows and flow tables installed in the SDN switch 302 inspect packet fields against match fields as specified in the flows and flow tables. If the SDN switch 302 determines that the packet contains a channel data message, the SDN Switch 302 removes the channel number and the length of the application data fields from the channel data message contained in a TCP and/or UDP packet and splices the remaining portions of the TCP and/or UDP packet together. The SDN switch 302 adjusts values in the fields of the TCP, UDP, and/or IP headers, as needed, to form a valid packet for transmission and relays the spliced packet.

The match fields used by the flows and flow tables to relay a packet may include inspecting fields in the channel data message and/or by inspecting fields in TCP and/or UDP packet that precede the channel data message in the TCP and/or UDP packet. The inspection and splicing may be implemented in the SDN switch 302 using software, firmware, hardware (e.g., fixed and/or programmable logic circuitry, such as gate arrays, FPGAs, SOCs and/or ASICs) or a combination of these implementations.

As discussed above with respect to FIG. 3, the flow of packets between the relay client 202 and the peer 204 is relayed using the SDN switches 302 that are closer to the edge of the network 104 reducing the overall network utilization of the network 104, without requiring any modification of the relay protocol in the relay client 202 and the peer 204. Network bandwidth and processing requirements for the relay server are reduced as packets are no longer relayed by the SDN relay server 306.

NAT Traversal Forwarding Using a Modified ICE Candidate List

In one or more embodiments, SDN techniques may be used to avoid using the TURN relay entirely. The SDN controller 304 may be configured to define flows and flow tables for a forwarding path for NAT traversal forwarding in advance of any request to relay packets for a P2P communication event. The peer hosts 102 may exchange candidate lists of transport addresses for a communication event. During the exchange, the candidate lists are communicated through a signaling server, such as a SIP server. The signaling server rewrites the candidate lists to include the forwarding path that was predetermined by the SDN controller 304. Alternatively, peer hosts 102 may be directly configured to add a transport address for the predetermined forwarding path to the list of candidate transport addresses the peer hosts 102 offer when attempting to establish a communication path using ICE.

The SDN controller 304 may configure one or more of the SDN switches 302 with the flows and flow tables defining the forwarding path in advance of a P2P communication event. Alternatively, flows and flow tables may be configured by the SDN controller 304 in the SDN switches 302 on demand when "not-matched" packets arrive to be relayed at the SDN switches 302.

Example Methods

Figure 4:
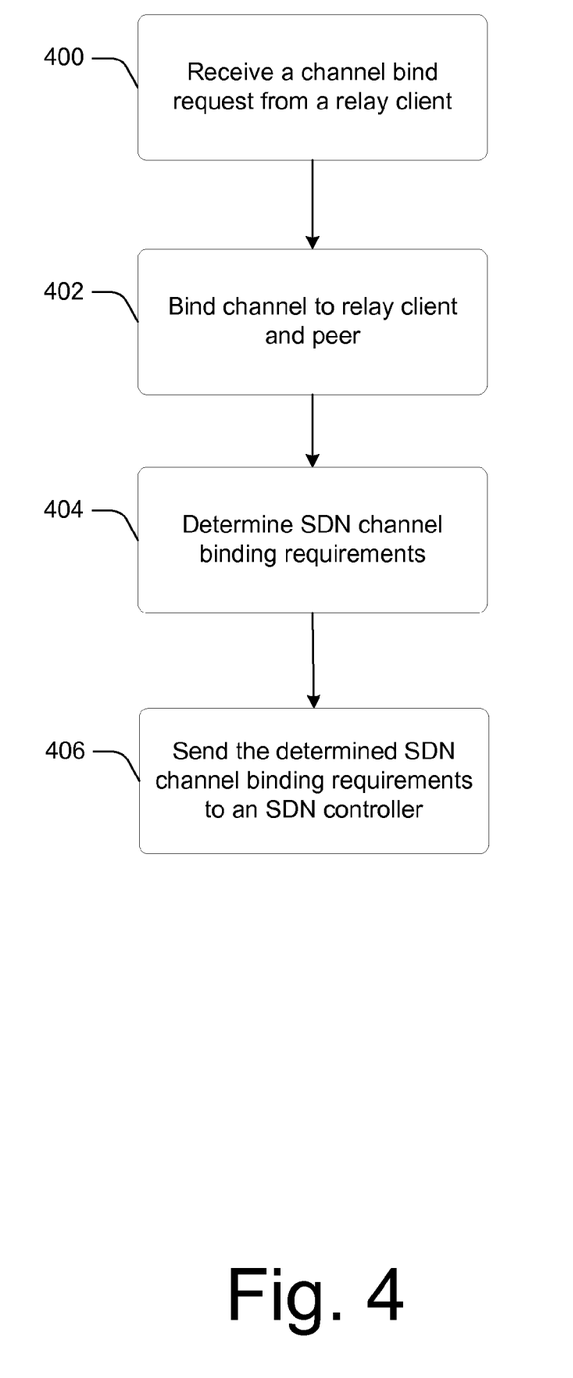
FIG. 4 is a flow diagram that describes steps in a method in accordance with one or more embodiments.

FIG. 4 is a flow diagram that describes steps in a method in accordance with one or more embodiments. The method can be implemented in any suitable hardware, software, firmware, or combination thereof. In at least some embodiments, the method can be implemented by a suitably-configured SDN relay server.

Step 400 receives a channel bind request at a relay server, from a relay client, to allocate a channel binding to relay packets from the relay client to a peer. For example, in at least some embodiments the channel bind request includes an unbound channel number and a transport address of the peer. Step 402 binds the channel to the relay client and the peer. This step can be performed in any suitable way. For example, the relay server allocates storage for the information included in the channel bind request to use when packets are received for relay. Optionally, the relay server responds to the relay client to indicate success or failure of the channel bind request. Responsive to receiving the channel bind request, step 404 determines SDN requirements for the channel binding. Step 406 sends the determined SDN requirements to an SDN controller, the SDN requirements being usable by the SDN controller to create flows and flow tables to configure a forwarding path for the channel binding in one or more SDN switches in order to relay packets between the relay client and the peer.

Figure 5:
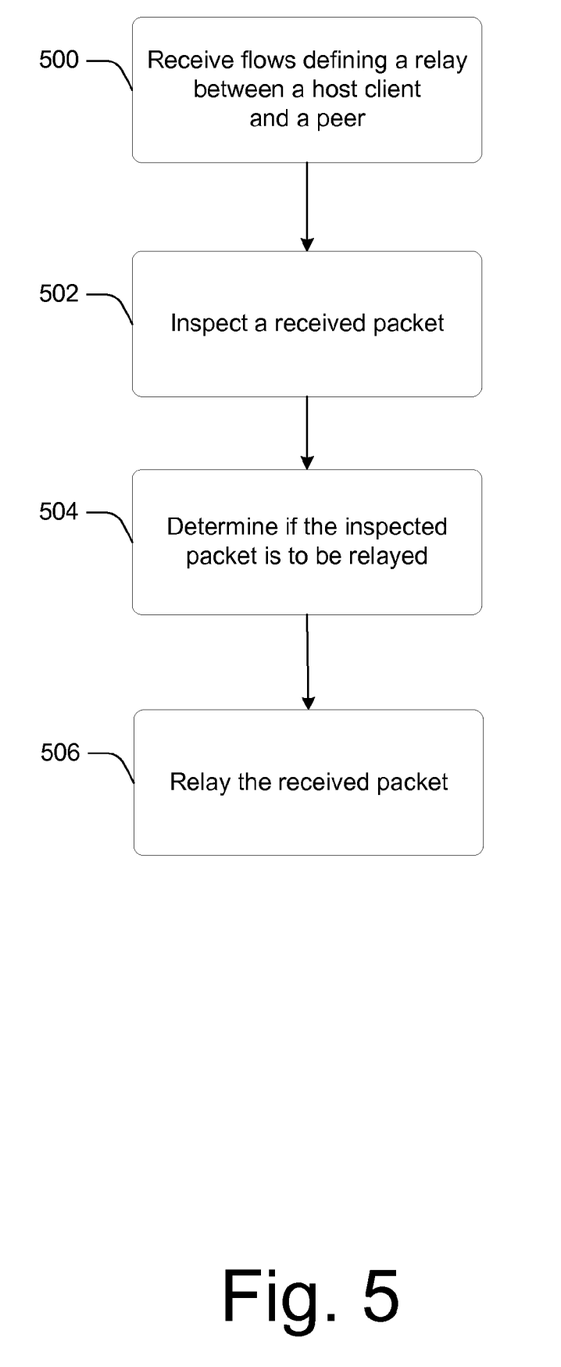
FIG. 5 is a flow diagram that describes steps in a method in accordance with one or more embodiments.

FIG. 5 is a flow diagram that describes steps in a method in accordance with one or more embodiments. The method can be implemented in any suitable hardware, software, firmware, or combination thereof. In at least some embodiments, the method can be implemented by a suitably-configured SDN switch.

Step 500 receives flows at a SDN switch defining a relay of packets between a relay host and a peer. This step can be performed in any suitable way. For example, the flows may be organized into one or more flow tables. Multiple flow tables may be arranged in a pipeline for sequential execution of the flow tables. The flows may comprise match fields that contain information usable to determine if a flow applies to a received packet based on fields in the received packet matching values in the match fields of a flow. Step 502 inspects the received packet to identify fields in the packet to compare to match fields in the one or more flows. Step 504 determines that the received packet is to be relayed. This step can be performed in any suitable way. For example, flows in the SDN switch perform the relay by inspecting fields in a TCP and/or UDP packet that precedes the channel data message in the TCP and/or UDP packet. The decision by the flows in the SDN switch to relay a packet can be made without inspecting the fields in the channel data message. For example, the one or more flows in the SDN switch compare values for any suitable combination of source address, destination address, TCP or UDP source port, TCP or UDP destination port, and/or differentiated service code point (DSCP) fields in the inspected packet to match field values to determine that SDN switch will relay the packet. Step 506 relays the received packet by forwarding the received packet to a port of the SDN switch in a direction toward a destination. This step can be performed in any suitable way. For example, the flows in the SDN switch relay packet from the relay client to the peer and from the peer to the relay client.

Figure 6:
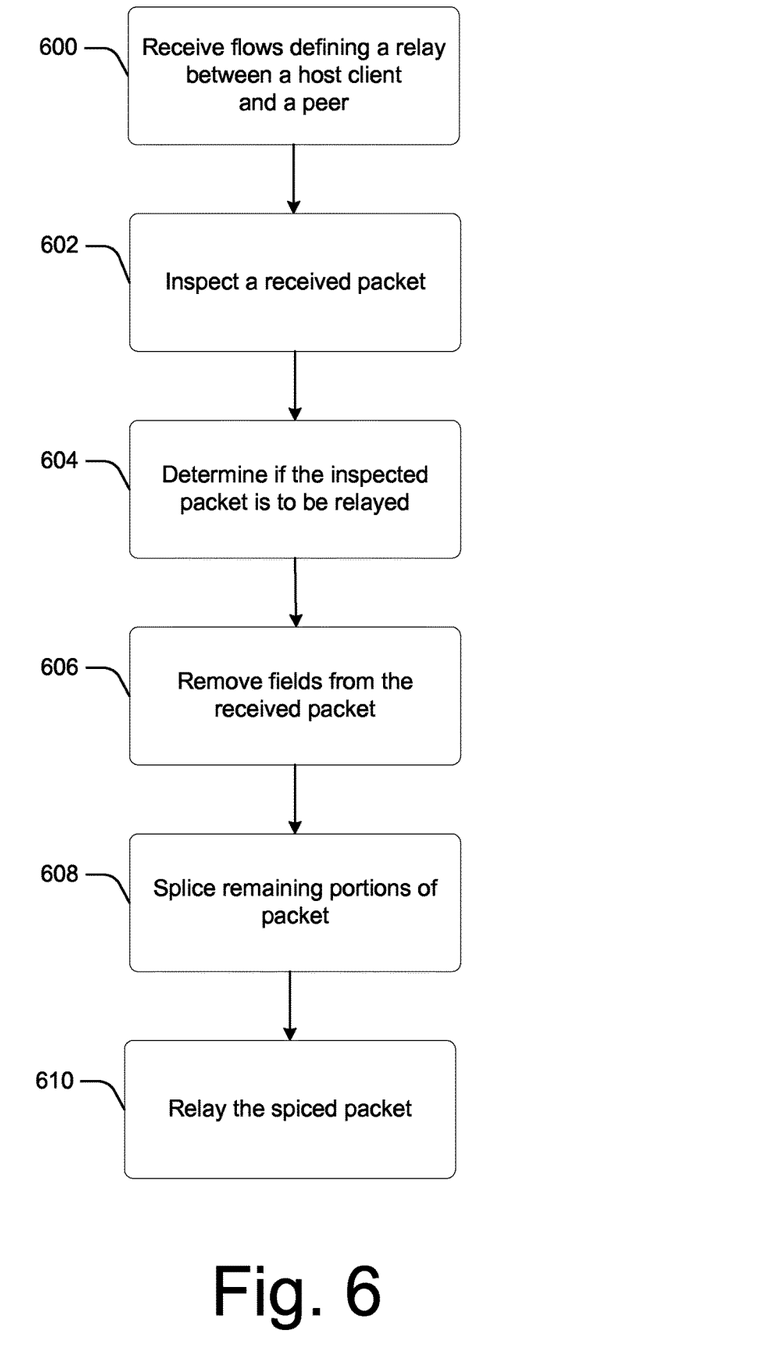
FIG. 6 is a flow diagram that describes steps in a method in accordance with one or more embodiments.

FIG. 6 is a flow diagram that describes steps in a method in accordance with one or more embodiments. The method can be implemented in any suitable hardware, software, firmware, or combination thereof. In at least some embodiments, the method can be implemented by a suitably-configured SDN switch.

Step 600 receives flows at a SDN switch defining a relay of packets between a relay host and a peer. This step can be performed in any suitable way. For example, the flows may be organized into one or more flow tables. Multiple flow tables may be arranged in a pipeline for sequential execution of the flow tables. The flows may comprise match fields that contain information usable to determine if a flow applies to a received packet based on fields in the received packet matching values in the match fields of a flow. Step 602 inspects the received packet to identify fields in the packet to compare to match fields in the one or more flows. Step 604 determines that the received packet is to be relayed. This step can be performed in any suitable way. For example, flows in the SDN switch perform the relay by inspecting fields in a TCP and/or UDP packet that precedes the channel data message in the TCP and/or UDP packet. The decision by the flows in the SDN switch to relay a packet can be made without inspecting the fields in the channel data message. For example, the one or more flows in the SDN switch compare values for any suitable combination of source address, destination address, TCP or UDP source port, TCP or UDP destination port, and/or differentiated service code point (DSCP) fields in the inspected packet to match field values to determine that SDN switch will relay the packet. Step 608 removes fields from the received packet, for example channel number and length fields of the channel data message in the packet. Step 608 splices the remaining portions of the packet together. Optionally, values in fields of the TCP, UDP, and/or IP headers may be adjusted as required to correctly reflect the properties of the spliced packet. Step 610 relays the spliced packet by forwarding the packet to a port of the SDN switch in a direction toward a destination. This step can be performed in any suitable way. For example, the flows in the SDN switch relay packet from the relay client to the peer and from the peer to the relay client.

Example Device

Figure 7:
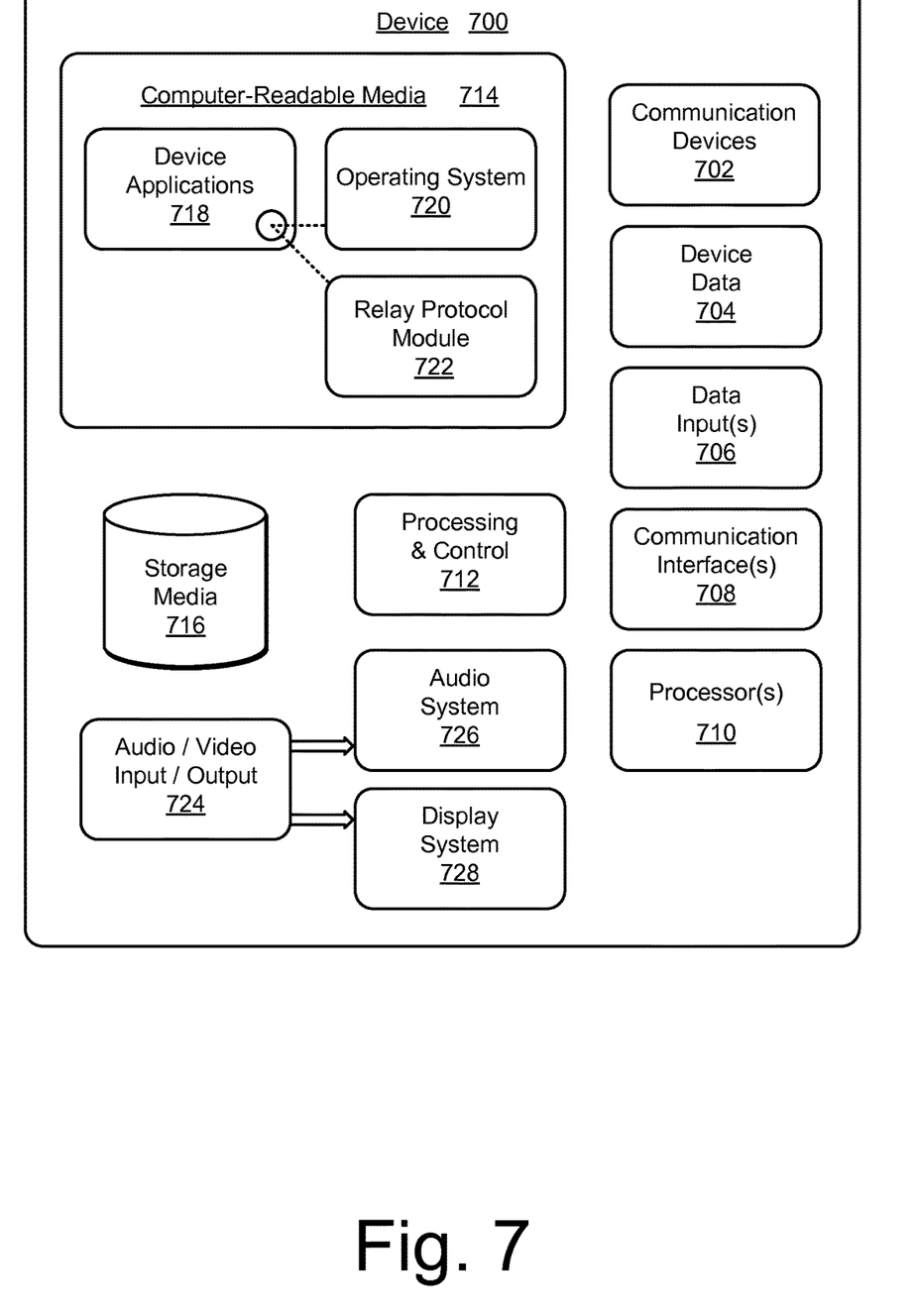
FIG. 7 is an example device in accordance with one or more embodiments.

FIG. 7 illustrates various components of an example device 700 that can be implemented as any type of portable and/or computer device to implement the embodiments described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable or readable instructions to control the operation of device 700 and to implement the embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.), as well as other applications that can include, web browsers, image processing applications, communication applications such as P2P communication applications, word processing applications and a variety of other different applications. The device applications 718 also include any system components or modules to implement embodiments of the techniques described herein. In this example, the device applications 718 can include a relay protocol module 722 that operates to implement embodiments of the techniques as described above.

Device 700 also includes an audio and/or video input-output system 724 that provides audio data to an audio system 726 and/or provides video data to a display system 728. The audio system 726 and/or the display system 728 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 726 and/or the display system 728 are implemented as external components to device 700. Alternatively, the audio system 726 and/or the display system 728 are implemented as integrated components of example device 700.

CONCLUSION

Various embodiments provide a system for modifying a channel binding in order to relay packets between a relay client and a peer in a peer-to-peer (P2P) communication event across a network. A relay server receives a request to bind a channel in order to relay the packets for the communication event. The relay server creates requirements for a communication path. The relay server sends the requirements to a Software Defined Networking (SDN) controller. The SDN controller in turn creates and installs flows and flow tables in SDN switches to relay the packets across the network for the communication event.

Various embodiments provide a SDN switch that relays packets across a network in a P2P communication event between a relay client and a peer. A SDN controller configures the SDN switch with flows and flow tables that the SDN switch uses to inspect fields in received packets between the relay client and the peer. Based upon one or more fields matching one or more of the flows, the SDN switch relays the received packets for the communication event.

Various embodiments enable modifying a list of candidate transport addresses for NAT traversal. A signaling controller modifies the candidate list by inserting transport addresses for a forwarding path, which relays packets between a relay client and a peer in a P2P communication event across a network. The forwarding path is preconfigured by a SDN controller.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A method of relaying packets in a network for a communication event, the method comprising:
    receiving a request from a relay client to bind a channel to a peer for the communication event;
    creating requirements for the channel to relay the packets for a software defined networking (SDN) controller, based on the received channel bind request;
    sending the created requirements to the SDN controller, effective to enable the SDN controller to configure one or more SDN switches to relay the packets in the communication event without requiring participation of a relay server to relay the packets; and
    sending a response to the relay client indicating the result of the channel bind request.

2. The method of claim 1, wherein the channel bind request comprises a channel number and a transport address for the peer.

3. The method of claim 1, wherein said configuring the one or more SDN switches comprises sending flows and flow tables, the flows and flow tables based on the created requirements, to the one or more SDN switches effective to configure the one or more SDN switches to relay the packets in the communication event.

4. The method of claim 3, wherein the relaying the packets includes one of the one or more SDN switches removing header fields of a channel data message.

5. The method of claim 3, wherein the relay client uses a modified relay protocol, the modified relay protocol comprising sending packets in the communication event without the header fields of a channel data message.

6. The method of claim 1, wherein the created requirements comprise one or more of a destination address, a destination port, a source address, a source port, or a differentiated service code point (DSCP) value.

7. The method of claim 1, wherein binding the channel expires after a period of time, the method further comprising:
    receiving a second request from the relay client to bind the channel to the peer; and
    sending a message to the SDN controller, effective to enable the SDN controller to refresh the configuration of the one or more SDN switches in order to continue relaying packets in the communication event.

8. The method of claim 1, wherein the receiving the request or the sending the created requirements are performed using authentication.

9. A system for relaying packets in a network for a communication event, the system comprising:
    a relay client; and
    one or more software defined networking (SDN) switches configured to relay the packets for the communication event such that the packets are not relayed by a relay server, the one or more SDN switches further configured to:
        receive a packet for the communication event from the relay client;
        inspect one or more fields in the received packet; and
        responsive to determining a match between the one or more fields in the packet and one or more flows installed in the one or more SDN switches, relay the received packet in the communication event.

10. The system of claim 9, further comprising:
    the relay server, configured to:
        receive a channel bind request from the relay client;
        create requirements for the channel binding to relay the packets, based on the received channel bind request;
        send the created requirements to an SDN controller;
        send a response to the relay client indicating the result of the channel bind request; and
    the SDN controller configured to:
        receive the created requirements from the relay server;
        create one or more flows, based on the received requirements; and
        install the created flows in the one or more SDN switches, effective to enable the one or more SDN switches to relay packets in the communication event.

11. The system of claim 10, wherein a single network host includes the relay server and the SDN controller.

12. The system of claim 9, wherein the relay client uses a modified relay protocol, the modified relay protocol comprising sending packets in the communication event without the header fields of a channel data message.

13. The system of claim 9, wherein the fields comprise one or more of a destination address, a destination port, a source address, a source port, or a differentiated service code point (DSCP) value.

14. The system of claim 9, further comprising:
    a signaling server configured to:
        insert a candidate transport address for a forwarding path into a candidate list of transport addresses being sent to the relay client for use with a connectivity establishment protocol for the communication event; and
    an SDN controller configured to:
        define one or more flows for the forwarding path that correspond to the inserted candidate transport address for the forwarding path; and
        install the defined flows in the one or more SDN switches, effective to enable the SDN switches to relay the packets in the communication event.

15. A software defined networking (SDN) switch configured to perform operations comprising:
    receiving one or more flows specifying operations to relay packets from a relay client to a peer device in a communication event without the packets being relayed by a relay server;
    receiving a packet from the relay client;

executing the specified operations to determine that one or more fields in the received packet matches one of the one or more flows; and responsive to the one or more fields in the received packet matching, relaying the packet to the peer device.

16. The SDN switch of claim 15, further configured to perform operations comprising:

determining that the one or more fields in the received packet do not match any of the one or more flows;

responsive to the determining, providing an indication of the determination to an SDN controller, the indication effective to enable the SDN controller to transmit one or more additional flows to the SDN switch;

receiving the one or more additional flows from the SDN controller;

determining, using the one or more additional flows, that the one or more fields in the received packet matches one of the one or more additional flows; and responsive to the one or more fields in the received packet matching, relaying the packet to the peer device.

17. The SDN switch of claim 16, wherein the packet with one or more fields determined not to match the one or more flows includes a channel data message.

18. The SDN switch of claim 17, wherein the SDN switch is further configured to remove header fields of the channel data message from the packet before relaying the packet.

19. The SDN switch of claim 15, wherein the one or more fields comprise one or more of a destination address, a destination port, a source address, a source port, or a differentiated service code point (DSCP) value.

20. The SDN switch of claim 18 wherein the header fields of the channel data message include one or more of a channel number or a length of application data.

21. A computer-implemented method comprising:

receiving one or more flows specifying operations to relay packets in a communication event without the packets being relayed by a relay server;

receiving a packet from a relay client;

inspecting one or more fields in the received packet;

responsive to determining a match between the one or more fields in the received packet and one of the one or more flows, relaying the packet in the communication event.

22. The method of claim 21, further comprising:

determining that the one or more fields in the received packet do not match any of the one or more flows;

responsive to the determining, providing an indication of the determination to a software defined networking (SDN) controller;

receiving one or more additional flows from the SDN controller;

determining, using the one or more additional flows, that one or more fields in the received packet matches one of the one or more additional flows; and responsive to the one or more fields in the received packet matching, relaying the packet in the communication event.

23. The method of claim 21, said relaying the packet comprising removing header fields of a channel data message from the packet before relaying the packet.

24. The method of claim 21, wherein the packet does not include header fields of a channel data message.

25. The method of claim 21, wherein the fields include one or more of a destination address, a destination port, a source address, a source port, or a differentiated service code point (DSCP) value.

\* \* \* \* \*